US008517638B2

(12) United States Patent
Taenaka et al.

(10) Patent No.: US 8,517,638 B2
(45) Date of Patent: Aug. 27, 2013

(54) UNDERWATER STRUCTURE, CONSTRUCTION METHOD THEREFOR, AND DESIGN METHOD AND RENOVATION METHOD OF UNDERWATER-SIDE STRUCTURE

(75) Inventors: Shinji Taenaka, Tokyo (JP); Ryoichi Kanno, Tokyo (JP); Yoshiaki Oikawa, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 0 days.

(21) Appl. No.: 13/511,835

(22) PCT Filed: Dec. 2, 2010

(86) PCT No.: PCT/JP2010/071560
§ 371 (c)(1),
(2), (4) Date: May 24, 2012

(87) PCT Pub. No.: WO2011/068152
PCT Pub. Date: Jun. 9, 2011

(65) Prior Publication Data
US 2012/0282036 A1 Nov. 8, 2012

(30) Foreign Application Priority Data

Dec. 2, 2009 (JP) .............................. P2009-274365

(51) Int. Cl.
*E02D 27/52* (2006.01)
(52) U.S. Cl.
USPC ......................................... 405/225; 405/224

(58) Field of Classification Search
USPC .................................. 405/224, 225, 227, 228
See application file for complete search history.

(56) References Cited

U.S. PATENT DOCUMENTS

| | | | | |
|---|---|---|---|---|
| 2,933,898 A | * | 4/1960 | Upson | 405/227 |
| 3,791,154 A | * | 2/1974 | Crain | 405/225 |
| 3,811,289 A | * | 5/1974 | Bassett | 405/225 |
| 3,832,857 A | * | 9/1974 | Bassett | 405/225 |
| 3,838,575 A | * | 10/1974 | Clark et al. | 405/227 |
| 4,070,869 A | * | 1/1978 | Williams | 405/225 |
| 4,171,923 A | * | 10/1979 | Landers | 405/225 |
| 4,214,843 A | * | 7/1980 | Rohde | 405/225 |
| 4,273,474 A | * | 6/1981 | Weidler | 405/225 |

(Continued)

FOREIGN PATENT DOCUMENTS

| | | |
|---|---|---|
| CN | 1800502 A | 7/2006 |
| JP | 10-511753 A | 11/1998 |

(Continued)

OTHER PUBLICATIONS

International Search Report issued in PCT/JP2010/071560 dated Feb. 15, 2011.

(Continued)

*Primary Examiner* — Frederick L Lagman
(74) *Attorney, Agent, or Firm* — Birch, Stewart, Kolasch & Birch, LLP

(57) ABSTRACT

This underwater structure is installed at the sea bed and supports an above-water structure that is provided above the water, being provided with a first support member made of steel that extends from the sea bed to above the water and that has a first space therein; and a filling material being filled in a portion of the first space.

17 Claims, 7 Drawing Sheets

(56) References Cited

U.S. PATENT DOCUMENTS

| | | | | |
|---|---|---|---|---|
| 4,372,704 A | * | 2/1983 | Knox | 405/225 |
| 4,412,759 A | * | 11/1983 | Britton et al. | 405/225 |
| 4,422,805 A | * | 12/1983 | Sweatman | 405/225 |
| 4,493,592 A | * | 1/1985 | Knox | 405/225 |
| 4,902,170 A | * | 2/1990 | Knox et al. | 405/225 |

FOREIGN PATENT DOCUMENTS

| | | |
|---|---|---|
| JP | 2002-97651 A | 4/2002 |
| JP | 2002-180460 A | 6/2002 |
| JP | 2002-188154 A | 7/2002 |
| JP | 2003-221816 A | 8/2003 |
| JP | 2004-11130 A | 1/2004 |
| JP | 2006-336555 A | 12/2006 |
| JP | 3871937 B2 | 1/2007 |
| JP | 4066256 B2 | 3/2008 |

OTHER PUBLICATIONS

Office Action issued in JP 2011-512759 dated Aug. 16, 2011.
Chinese Office Action, dated Mar. 5, 2013, for Chinese Application No. 201080052692.4, including English translation of the Search Report.

* cited by examiner

UNDERWATER STRUCTURE, CONSTRUCTION METHOD THEREFOR, AND DESIGN METHOD AND RENOVATION METHOD OF UNDERWATER-SIDE STRUCTURE

TECHNICAL FIELD

The present invention relates to an underwater structure such as a jacket structure that is used for supporting an above-water structure, a construction method therefor, and a design method and renovation method of an underwater structure.

Priority is claimed on Japanese Patent Application No. 2009-274365, filed Dec. 2, 2009, the content of which is incorporated herein by reference.

BACKGROUND ART

Conventionally, a jacket structure that is utilized as an oil drilling structure is known as a representative example of an underwater frame structure that is installed on the sea bed foundation (for example, refer to Patent Documents 1 and 2). This jacket structure is constituted by moving one that consists of steel legs, horizontal braces and diagonal braces pre-assembled at an on-shore yard to the installation location, and fixing to the sea bed foundation. Thereby, construction work at the construction site is simplified, and the construction period is shortened.

In this kind of jacket structure, the frame that is constituted from legs and braces is generally manufactured with steel as disclosed in Patent Documents 1 and 2. On the other hand, a jacket structure that has legs and horizontal struts made of reinforced concrete (RC structure) has been proposed (for example, refer to Patent Document 3).

As a connection structure with piles in the above jacket structure, a structure has been adopted that inserts one of a leg and pile into the other, and by filling a grout in mutual gaps in this insertion portion, integrates the leg and the pile. Also, a leg and a horizontal strut with an RC structure disclosed in Patent Document 3 are bolt-connected via a steel joint member. A joint structure is adopted that integrates the leg and the horizontal strut by filling grout or a similar material inside this joint member.

PRIOR ART DOCUMENTS

Patent Documents

[Patent Document 1] Japanese Patent Publication No. 4066256
[Patent Document 2] Japanese Patent Publication No. 3871937
[Patent Document 3] Japanese Unexamined Patent Application, First Publication No. 2004-11130

DISCLOSURE OF THE INVENTION

Problems to be Solved by the Invention

In the case of a conventional underwater structure such as the aforementioned typical jacket structure, the frame is designed to withstand external forces from the upper structure and waves, in addition to the depth to the sea bed. Specifically, the cross section of each member is determined so that the cross-sectional strength of the members that constitute the frame improves. For this reason, it is necessary to individually design each in accordance with the load condition of the upper structure and various conditions such as the depth to the sea bed, and carry out manufacturing and construction based on this design result. For this reason, in a conventional underwater structure, it is necessary to redo the design each time the various conditions change, and since the manufacturing condition such as the member cross section differs with each condition, the manufacturing efficiency drops. Moreover, in the case of a condition changing after the provision, substantial reinforcement work becomes necessary, such that there is a cost of time and money at the design stage and manufacturing stage prior to installation. Moreover, there is also the inconvenience of maintenance trouble and cost after provision.

In particular, unlike an oil drilling structure, in the case of supporting a wind mill for wind power generation serving as an above-water structure, the natural period corresponding to the rotation frequency of the blades characteristic of the windmill exerts a significant effect on the underwater structure. Thereby, the need arises to design the underwater structure so as to have a suitable natural period so that the windmill and the underwater structure do not resonate. However, when attempting to design the frame so as to increase the frame strength that is required due to the various conditions as stated above, and moreover so as to become the suitable natural period, the complicatedness of the design increases. Accompanying that complicatedness, the member cross section also increases, leading to the occurrence of problems such as the manufacturing efficiency dropping further.

On the other hand, in addition to the conditions of the above-water structure, the offset yield strength and rigidity of piles changes as the sea bed foundation surface moves, due to environmental changes such as scouring and the like of the sea bed foundation around the piles due to ocean currents and the like. Thereby, the natural period of the underwater structure shifts from the design value, and as a result, resonance between the underwater structure and the above-water structure, and resonance between the underwater structure and the waves may occur. Also, after installation, by replacing the above-water structure (for example, a windmill or the like), in the case of that natural period having changed (for example, in the case of the rotational frequency of the windmill having changed or the like), even if the natural period of the underwater structure maintains the design value, resonance between the underwater structure and the above-water structure, and resonance between the underwater structure and the waves may occur.

An object of the present invention is to provide an underwater structure that can reduce the effort and cost required for design and manufacture and also enhance the maintainability after provision, a construction method therefor, and a design method and renovation method of an underwater structure.

Means for Solving the Problems (1) The underwater structure according to one aspect of the present invention is an underwater structure that is installed at a sea bed and that supports an above-water structure that is provided above a water, wherein: the underwater structure includes a first support member made of steel that extends from the sea bed to above the water, the first support member being formed with a first space therein; and the first space has a portion in which a filling material is filled.

(2) In the underwater structure according to the aforementioned (1), it is preferable that the underwater structure include: a plurality of the first support members; and a second support member made of steel that couples the plurality of the first support members, the second support member being formed with a second space therein.

(3) In the underwater structure according to the aforementioned (2), it is preferable that the second space have a portion in which the filling material is filled.

(4) In the underwater structure according to the aforementioned (1), it is preferable that the underwater structure further include a second support member made of steel that couples the above-water structure and the first support member, or couples the first support member and another member that is provided at the sea bed, the second support member being formed with a second space therein.

(5) In the underwater structure according to the aforementioned (4), it is preferable that the second space have a portion in which the filling material is filled.

(6) In the underwater structure according to any one of the aforementioned (1) to (5), it is preferable that at least the first support member among the first support member and the second support member include a steel pipe having a closed cross section; and the filling material be filled within the steel pipe.

(7) In the underwater structure according to any one of the aforementioned (1) to (5), it is preferable that the filling material include any of concrete, reinforced concrete, fiber-reinforced concrete, mortar, and crushed rock.

(8) In the underwater structure according to any one of the aforementioned (1) to (5), it is preferable that the above-water structure include a rotating body.

(9) A method of constructing the underwater structure according to any one of the aforementioned (2) to (5) preferably has: filling the filling material in at least a portion of the first space, among the first space and the second space; and installing the underwater structure at the sea bed, after filling the filling material.

(10) A method of constructing the underwater structure according to any one of the aforementioned (2) to (5) preferably has: installing the underwater structure at the sea bed; and filling the filling material in at least a portion of the first space, among the first space and the second space.

(11) A method of constructing the underwater structure according to the aforementioned (1) preferably has: filling the filling material in a portion of the first space; and installing the underwater structure at the sea bed, after filling the filling material.

(12) A method of constructing the underwater structure according to the aforementioned (1) preferably has: installing the underwater structure at the sea bed; and filling the filling material in a portion of the first space, after installing the underwater structure.

(13) A method of designing the underwater structure according to any one of the aforementioned (2) to (5) preferably has: calculating a filling position and a filling amount of the filling material to be filled in at least a portion of the first space, among the first space and the second space, based on a natural period of the above-water structure; and filling the filling material of the filling amount at the filling position.

(14) A method of designing the underwater structure according to the aforementioned (1) preferably has: calculating a filling position and a filling amount of the filling material to be filled in a portion of the first space, based on a natural period of the above-water structure; and filling the filling material of the filling amount to the filling position.

(15) A method of renovating an underwater structure according to one aspect of the present invention is a method of renovating an existing underwater structure that is provided with a first support member made of steel that is installed at a sea bed and that supports an above-water structure provided above a water, the renovating being performed along with changes in a surrounding environment, the method including: filling a filling material of a filling amount that is calculated based on a change amount of the surrounding environment in a portion of a first space that is formed in the first support member.

(16) A method of renovating an underwater structure according to one aspect of the present invention is a method of renovating an existing underwater structure that is provided with a first support member made of steel that is installed at a sea bed and that supports an above-water structure provided above a water, the method including: in a case where a natural period of the above-water structure changes before and after the renovation, filling a filling material of a filling amount that is calculated based on a change amount of this natural period in a portion of a first space that is formed in the first support member.

(17) The method of renovating an underwater structure according to the aforementioned (15) or (16) may include, in a case where a plurality of the first support member is provided, and the underwater structure is further provided with a second support member made of steel that connects these first support members and that has a second space therein, filling the filling material in at least a portion of the second space.

Effects of the Invention

In the underwater structure according to the aforementioned (1), a filling material is filled in a portion of the first space of the first support member so that the underwater structure assumes the desired natural period. Thereby, it is possible to provide an underwater structure that has the desired natural period.

Here, as the filling position of the filling material, it is filled in a portion of the first support member. For example, in the case of lengthening the natural period (shortening the natural frequency) of an underwater structure, it is preferable to impart the added weight of the filling material to the upper portion side, that is, the side close to the water surface. Conversely, in the case of shortening the natural period (lengthening the natural frequency) of the underwater structure, it is preferable to impart the added rigidity of the filling material to the lower portion side, that is, the side close to the sea bed. Moreover, as the filling material, it is not a structural material that is restricted to use between an outer pipe and an inner pipe used in the joining of members, such as a conventional grout. The filling material is used as added weight and added rigidity. Accordingly, the filling position is the first space within the first support member, without being limited to the joining portions of members, for example, to the joining positions between the piles that are driven into the sea bed and each member. That is to say, it is possible to fill at a position in which filling or non-filling of the filling material is suitably selectable, and it is preferable to fill the filling material at a portion in which the contribution to adjustment of the frequency (oscillation frequency) is large.

Also, in relation to the grout or the like that is filled at the joining portions between members or the connection portion between a pile and a member, it becomes added weight and added rigidity for the first support member, and thereby imparts an effect to the natural period of the underwater structure. Thereby, the filling position and filling amount are set in accordance with the filling material, such as this kind of grout or the like.

The underwater structure according to the aforementioned (2) is a jacket structure that is provided with a first support member and a second support member, and a filling material is filled in a first space of the first support member. That is to say, the filling material is filled in a portion of the first support member that constitutes the frame, such that the underwater structure assumes the desired natural period. Accordingly, simplification of the design step is attained by designing the steel frame strength in accordance with a predetermined condition, and after designing, the filling position and filling amount of the filling material are suitably set in accordance with the natural period of the above-water structure. Thereby, since it is possible to adjust the natural period of the underwater structure with the filling material without changing the frame strength, that is to say, the cross section of members, it is possible to prevent resonance between the underwater structure and the above-water structure, and it is possible to realize an economical design by improving the efficiency of the design step of the underwater structure. Moreover, due to the simplification of the design step of the underwater structure, it is also possible to improve the manufacturing efficiency by eliminating adverse effects exerted on the manufacturing step, such as standardization of the first and second support members that constitute the frame being achieved, and omitting excessive reinforcement of the first and second support members. Also, it is possible to adjust the natural period of an underwater structure just by filling the filling material in a portion of the frame, in response to environmental changes such as scouring of the foundation at the sea bed during service after installing the underwater structure at the sea bed, and changes in the natural period during replacement of the above-water structure. As a result, it is possible to prevent resonance between the underwater structure and the above-water structure or waves. Moreover, since significant reinforcement need not be carried out on the frame itself, it is possible to keep down the time and effort as well as costs of maintenance.

According to the underwater structure of the aforementioned (3), since the filling material is filled not only in the first space but also the second space, it is possible to finely adjust the natural period of the underwater structure.

The underwater structure of the aforementioned (4) is effective also for a tri-pile (tripod) structure that is provided with a second support member that couples the above-water structure and the first support member, or a tri-pile (tripod) structure that is provided with a second support member that couples the first support member and another member that is provided at the sea bed (for example, a pile).

In these structures, the filling material is filled in the first space so that the underwater structure assumes the desired natural period. Thereby, as stated above, it is possible to prevent resonance between the underwater structure and the above-water structure without changing the frame strength, that is to say, the cross section of members, and it is possible to realize an economical design by improving the efficiency of the design step of the underwater structure.

According to the underwater structure of the aforementioned (5), the filling material is filled in the first space and the second space. That is to say, since the filling material is not only filled in the first space but also the second space, it is possible to finely adjust the natural period of the underwater structure.

According to the underwater structure of the aforementioned (6), by filling the filling material in a steel member with a closed cross section (for example, a steel pipe), it is possible to reliably fill the filling material even without installing leakage prevention such as formwork or the like, and it is possible to improve the workability of the filling work. Also, in the case of being a steel member with a closed cross section, it is possible to fill the filling material comparatively easily and in a dense manner, and it is possible to raise the unity of the steel pipe and the filling material. Thereby, it is possible to reliably demonstrate the added rigidity of the underwater structure after the filling.

According to the underwater structure of the aforementioned (7), it is possible to suitably adjust the added weight and the added rigidity that are required while ensuring the filling property by selecting a suitable filling material in accordance with the framework structure of the underwater structure and the cross-sectional shape of each member. Thereby, it is possible to achieve a much more economical design and greater efficiency.

According to the underwater structure of the aforementioned (8), a large windmill or the like for electrical generation can serve as an example of an above-water structure that includes a rotating body. In the case of supporting this windmill by the underwater structure, when the rotation period of the rotating body and the natural period of the underwater structure become matched, the possibility arises of them mutually resonating.

In contrast, in the underwater structure according to one aspect of the present invention, by filling a filling material in at least the first space of the first support member among the first support member and the second support member, weight and rigidity are added to it. That is to say, since the filling material is added such that the underwater structure assumes the desired natural period, it is possible to prevent resonance between the underwater structure and the rotating body.

According to the construction method of an underwater structure of the aforementioned (9) and (11), prior to installing the underwater structure, by filling a filling material in the state of the frame having been assembled at for example a yard (on land), the workability of the filling work improves, and it is possible to improve the filling property in each member. Moreover, it is possible to make the piping length for filling shorter than the case of filling the filling material after installing the underwater structure at the sea bed.

According to the construction method of an underwater structure of the aforementioned (10) and (12), by filling the filling material after installing the underwater structure at the sea bed, it is possible to lighten the weight when conveying the underwater structure to the installation location, and it is possible to improve the conveying efficiency.

According to the construction method of an underwater structure of the aforementioned (13) and (14), by designing the steel frame strength in accordance with predetermined conditions, it is possible to simplify the design step. That is to say, after designing the underwater structure, the filling position and the filling amount of the filling material are suitably set in accordance with the natural period of the above-water structure. Thereby, it is possible to prevent resonance with the above-water structure even without changing the frame strength, that is, the cross section of each member, and by improving the efficiency of the design step of the underwater structure it is possible to realize an economical design.

According to the renovation method of an underwater structure of the aforementioned (15) and (16), as stated above it is possible to adjust the natural period of an underwater structure just by adding a filling material to a portion of the first support member, in response to changes in the natural period of the underwater structure due to environment changes during service after installation or changes of the natural period due to replacement of the above-water structure. Accordingly, it is possible to prevent resonance between the above-water structure or waves and the underwater structure, and moreover since significant reinforcement need not be carried out on the first support member itself, it is possible to keep down the time and effort as well as costs of maintenance.

According to the renovation method of an underwater structure of the aforementioned (17), since the filling material is filled not only in the first space but also the second space, it is possible to finely adjust the natural period of the underwater structure.

According to the underwater structure of one aspect of the present invention as mentioned above, the construction method therefor, the design method of the underwater structure, and the renovation method of the underwater structure, there is no need to carry out significant design changes or reinforcement to the first support member and the second support member that constitute the framework of the underwater structure. Thereby, it is possible to realize an economical design by improving the efficiency of the design step, and it is possible to improve the efficiency of manufacturing the first and second support members and each member thereof. Accordingly, by designing an underwater structure in which the members and framework are standardized based on predetermined conditions, and imparting added weight and added rigidity by filling the filling material at a suitable position of this underwater structure, it is possible to easily accommodate conditions such as the natural period of the above-water structure. Thereby, by achieving standardization of an underwater structure that is suited to large-scale production, it is possible to achieve further improvements in the manufacturing efficiency by large-scale production. Moreover, since it is possible to adjust the natural period of an underwater structure by easily responding to environmental changes during service or replacement of the above-water structure, it is possible to perform renovation with good efficiency.

EMBODIMENT OF THE INVENTION

Hereinbelow, embodiments of the present invention shall be described with reference to the drawings.

Figure 1:
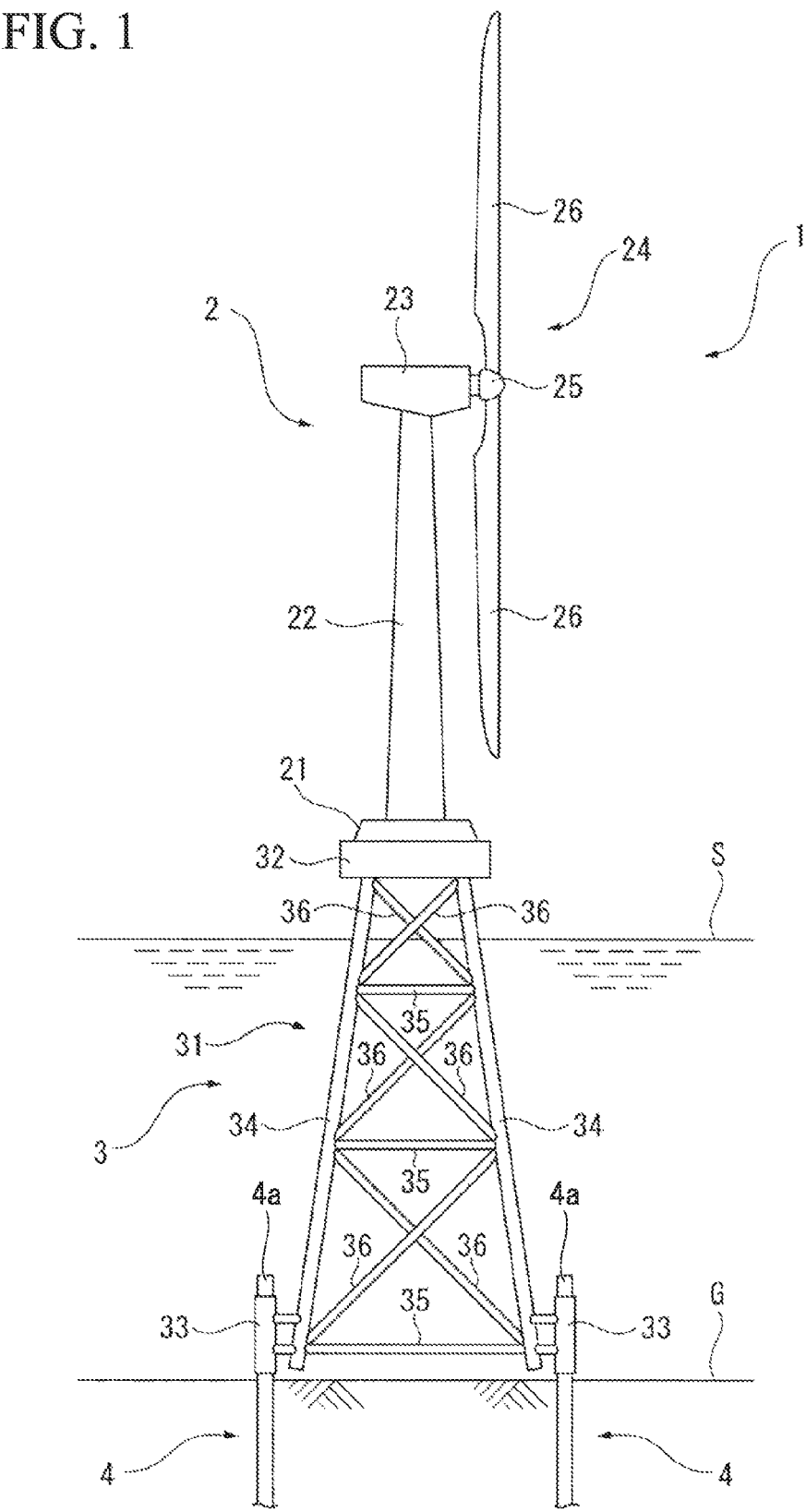
FIG. 1 is a side view that shows a wind-power generation facility using the underwater structure according to the first embodiment of the present invention.

A wind-power generation facility 1 is established on the sea at a marine coastal area, or on a lake of a flat inland area. The wind-power generation facility 1, as shown in FIG. 1, is provided with a windmill 2 serving as an above-water structure that is provided above the water surface S, a jacket 3 as an underwater structure that supports this windmill 2, and a plurality of piles 4 that fix this jacket 3 to the sea bed G. Also, power generation equipment not shown is provided in the windmill 2 and at the upper portion of the jacket 3, and is constituted to be able to send the electrical power that is generated in the wind-power generation facility 1 to substations facilities and the like.

The windmill 2 is provided with a base 21 that is fixed to the upper portion of the jacket 3, a support column 22 that extends upward from this base 21, a rotary support portion 23 that is fixed to the upper end of the support column 22, and a rotating body 24 that is rotatably supported by the rotary support portion 23. The rotating body 24 has an axial support portion 25 that is supported by the rotary support portion 23, and a plurality (for example, three) of blades 26 that are fixed to this axial support portion 25 and extend in the radial direction. The rotating body 24 rotates upon the blades 26 receiving wind, whereby electricity is generated by the power generation equipment that receives this rotation energy.

The jacket 3 is formed by being equipped with a frame 31 made of steel, a platform 32 that is provided on this frame 31 above the water surface S to support the windmill 2, and connection portions 33 that are provided at the lower portion of the frame 31 and connected to the piles 4. The frame 31 is constituted with a plurality of legs (first support members) 34 serving as main members, and horizontal braces (second support members) 35 and diagonal braces (second support members) 36 serving as sub-members.

Each leg 34 extends from the sea bed G beyond the water surface S to above the water. Also, the horizontal braces 35 and the diagonal braces 36 couple the plurality of legs 34, and are installed to hang across adjacent legs 34.

The legs 34, the horizontal braces 35 and the diagonal braces 36 are constituted by steel pipes having a cylindrical closed cross section, and are coupled by welding connections. Each connection portion 33 is constituted by a steel pipe that is coupled via arms to the lower end portion of the leg 34, and is fixed via a suitable grout with the pile 4 that is inserted inside of this steel pipe.

Each pile 4 is respectively constituted by a circular steel pipe, is inserted to a suitable depth of the sea bed foundation, and a pile head 4a that projects from the sea bed G by a suitable height is fixed to the connection portion 33 of the jacket 3. These piles 4, in the state of being penetrated into the sea bed foundation in advance prior to installation of the jacket 3, may be fixed by being inserted into the connection portions 33 of the jacket 3 that is conveyed from above. Also, the piles 4, in the state of being inserted in a pre-fixed state in the connection portions 33 of the jacket 3, may be conveyed with the jacket 3 and fixed to the connection portion 33 with grout after being penetrated into the sea bed foundation.

Figure 2:
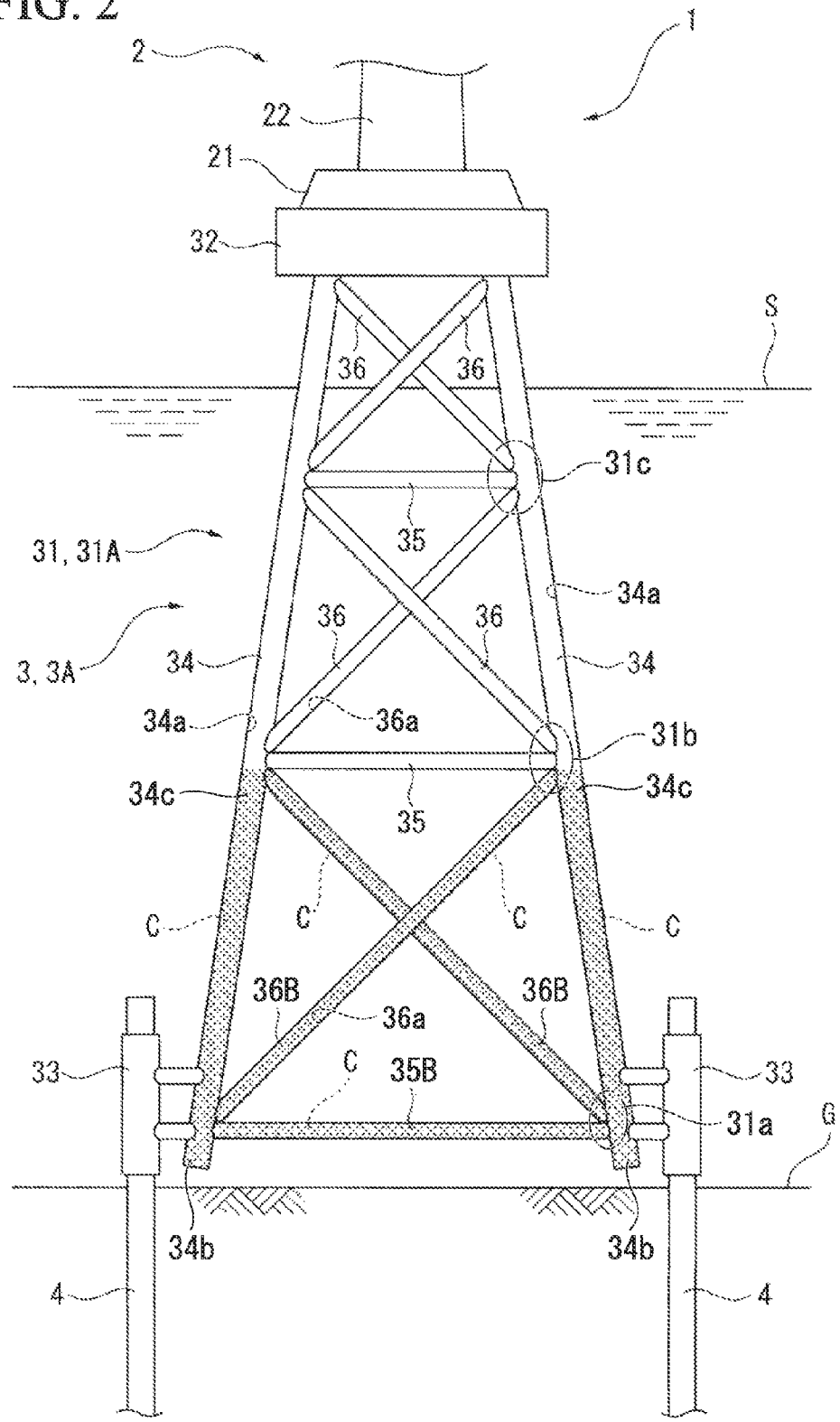
FIG. 2 is an enlarged view of the same underwater structure.

In the jacket 3A of the first embodiment, as shown in FIG. 2, concrete C is filled as a filling material in the lower portion of the frame 31, that is to say, in a first space 34a in the leg 34 positioned on the sea bed G side, and some of a second space 35a in the horizontal brace 35, and a second space 36a in the diagonal brace 36.

Figure 3:
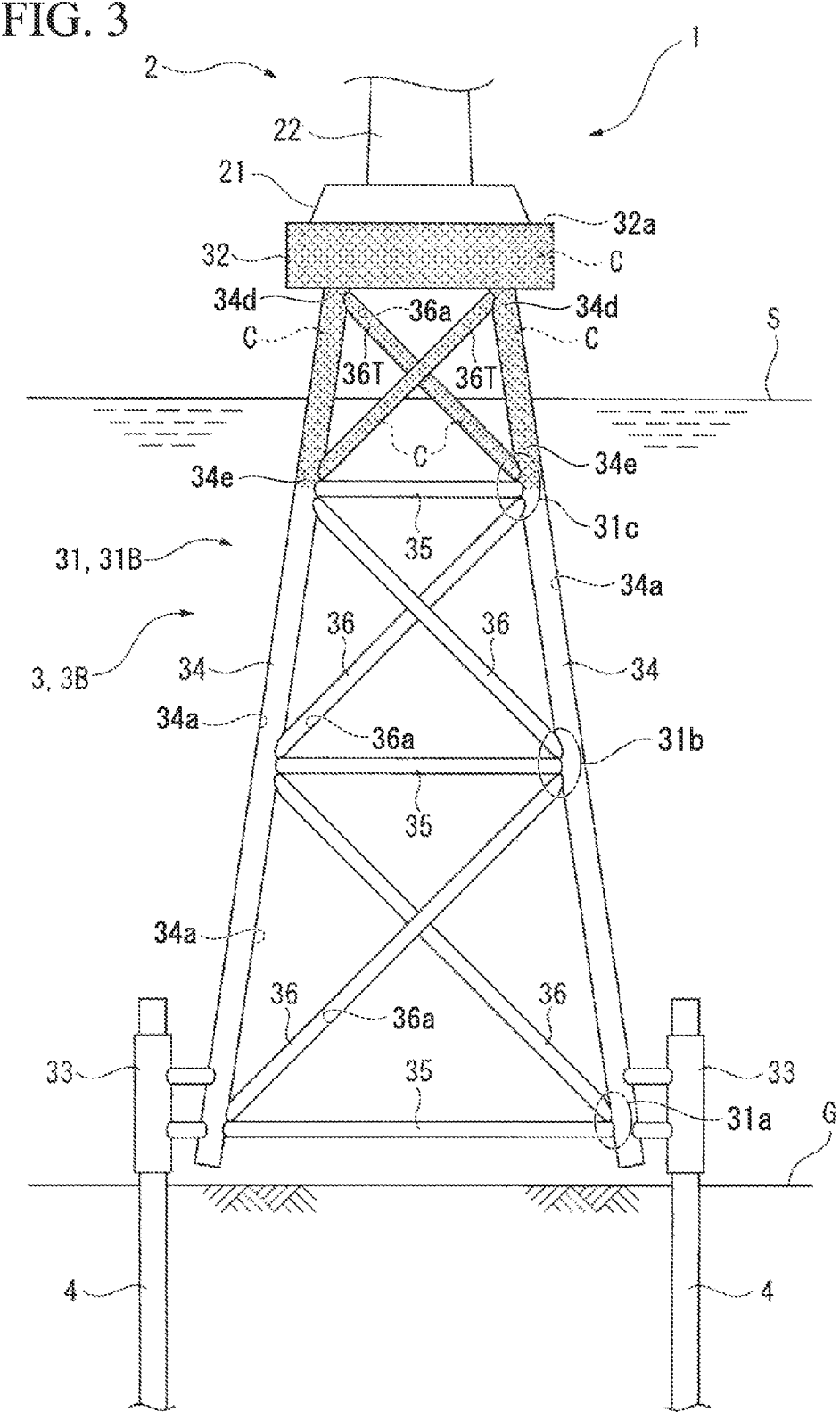
FIG. 3 is an enlarged view of the underwater structure according to the second embodiment of the present invention.

Also, in a jacket 3B of the second embodiment, as shown in FIG. 3, concrete C is filled as a filling material in the upper portion of the frame 31, that is to say, in a portion of a first space 34a in the leg 34 positioned on the water surface S side, some of the second space 36a of the diagonal brace 36, and the interior 32a of the platform 32. Here, by filling the concrete C only in the first space 34a in the leg 34 and the second space 36a of the diagonal brace 36, in the case of assuming the desired natural period, there is no need to fill the concrete C in the interior 32a of the platform 32.

First, in the jacket 3A of the first embodiment, the concrete C is filled in the lowest-stage horizontal braces 35B, the lowest-stage diagonal braces 36B, and the sea bed G side (lower end side) of the legs 34. Here, the water bottom G side of the legs 34 refers to the range from the lower end portion 34b of the legs 34b to the connection portion 34c of the legs 34 at which the diagonal braces 36B and the legs 34 are coupled.

Also, the concrete C is not filled in the frame 31 positioned above the second horizontal braces 35 from the bottom, and the connection portions 33. As a result of the concrete C being filled in the lower portion of the frame 31 (water bottom G side) of the jacket 3A of this first embodiment, the weight and rigidity of the lower portion is increased compared to the case of filling the concrete C in the upper portion (water surface S side). That is to say, added weight and added rigidity are imparted. In particular, due to the influence of added rigidity being imparted, compared to the natural period Ts0 of the frame 31 in the case of not filling the concrete C, the natural period Ts1 of the frame 31A in which concrete C is filled in the lower portion becomes shorter (Ts1<Ts0), that is, the period becomes shorter.

In the structure in which the height of the jacket 3A is around 40 m, Table 1 shows an example of the change in the frequency (period) when concrete C is filled only in a portion of the first space 34a in the legs 34 positioned on the sea bed G side. The length ratio refers to the ratio of the filling range of the concrete C with respect to the total length of the leg 34. That is to say, in the case of the concrete C being filled in the entire length of the jacket 3A, the length ratio would be 1.

The frequency ratio is the ratio of the frequency of the jacket 3A corresponding to the filling amount of concrete C, with respect to the frequency when concrete C is not filled in the jacket 3A. Also, the filling amount from the bottom of the jacket 3A increases in the order of Case 1, 2, 3, 4, 5.

TABLE 1

|  | No Filling | Case 1 | Case 2 | Case 3 | Case 4 (Completely Filled) |
|---|---|---|---|---|---|
| Length Ratio | 0.0 | 0.29 | 0.42 | 0.51 | 1.0 |
| Frequency Ratio | 1.0 | 1.060 | 1.063 | 1.070 | 0.880 |

In Cases 1 to 3 of the jacket 3A of the first embodiment shown in Table 1, it is confirmed that the natural frequency becomes longer by a little less than 10% of the natural period (the natural period becomes shorter), without changing the frame structure of the jacket 3A. The change rate of this natural period is strongly influenced by the rigidity in the stricture prior to the filling, and in the case of the rigidity of the structure prior to the filling being low, it is possible to obtain a more pronounced effect.

On the other hand, in Case 4 in which concrete C is filled in the entire jacket 3A, the natural frequency becomes shorter (the natural period becomes longer). From this result, it is preferable that the filling range of the concrete C be filled in a portion of the jacket 3A. That is to say, in the case of making the natural period of the jacket 3 shorter, it is preferable to concentrate it in the lower portion as shown in FIG. 2.

Moreover, as the length ratio from the bottom portion exceeds 50% and becomes 100%, there is a tendency for the natural frequency to become shorter. For this reason, in the case of lengthening the natural frequency, it is desirable to make the length ratio from the upper portion 50% or less or 60% or less. However, the minimum length ratio often depends on the leg length between the nodular point portions 31a, 31b, 31c at which the horizontal braces 35 intersect with the legs 34, that is to say, the length between the nodular point portion 31a and the nodular point portion 31b, and the length between the nodular point portion 31b and the nodular point portion 31c, and in order to suppress axial compression and bending deformation of the legs, it is preferable to fill a leg length of at least one layer portion. In many cases, since the jacket structure consists of 10 layers or less, with regard to the preferred length ratio, approximately 10% is the minimum range. That is to say, it is preferable for the length ratio from the bottom portion to be 10% or more, 15% or more, or 20% or more. In terms of length from the bottom portion, 5 meters or more, 8 meters or more, or 10 meters or more is preferable.

On the other hand, in the jacket 3B of the second embodiment shown in FIG. 3, the concrete C is filled in the diagonal braces 36T of the highest stage, the water surface S side (upper end side) of the legs 34, and the interior 32a of the platform 32. Here, the water surface S side of the legs 34 specifically denotes the range from the upper end portion 34d of the legs 34 to the connection portion 34e of the legs 34 at which the diagonal braces 36T and the legs 34 are coupled.

Also, the concrete C is not filled in the frame 31 positioned below the horizontal brace 35 of the first stage from the top, and the connection portions 33. By the filling of concrete C in the upper portion (water surface S side) of the frame 31 of the jacket 3B of this second embodiment, the weight and rigidity of the upper portion are increased compared to the case of filling the concrete C in the lower portion (sea bed G side). That is to say, added weight and added rigidity are imparted. In particular, due to the influence imparted by the added weight, compared with the natural period Ts0 of the frame 31 of the case of not filling concrete C, the natural period Ts2 of the frame 31B in which concrete C is filled in the upper portion becomes longer (Ts2>Ts0), that is to say, the period is longer.

In the structure in which the height of the jacket 3B is around 40 m, Table 2 shows an example of changes in the frequency (period) when concrete C is filled only in the water surface S side (upper end portion) of the legs. The length ratio refers to the filling range of the concrete C with respect to the total length of the leg 34. That is to say, in the case of the concrete C being filled in the entire length of the jacket 3B, the length ratio would be 1.

The frequency ratio is the ratio of the frequency of the jacket 3B corresponding to the filling amount of concrete C, with respect to the frequency when concrete C is not filled in the jacket 3A. Also, the filling amount from the upper portion of the jacket 3A increases in the order of Case 1, 2, 3, 4, 5.

TABLE 2

|  | No Filling | Case 1 | Case 2 | Case 3 | Case 4 (Completely Filled) |
|---|---|---|---|---|---|
| Length Ratio | 0.0 | 0.33 | 0.42 | 0.54 | 1.0 |
| Frequency Ratio | 1.0 | 0.820 | 0.865 | 0.820 | 0.880 |

In Cases 1 to 3 of the jacket 3B of the second embodiment shown in Table 2, it is confirmed that the natural frequency becomes shorter by a little less than 20% of the natural period (the natural period becomes longer), without changing the frame structure of the jacket 3B. The change rate of this natural period is strongly influenced by the rigidity in the stricture prior to the filling, and in the case of the rigidity of the structure prior to the filling being low, it is possible to obtain a more pronounced effect.

On the other hand, in Case 4 in which concrete C is filled in the entire jacket 3B, the change rate of the natural period thereof is low. From this result, it is preferable that the filling range of the concrete C be filled in a portion of the jacket 3B. That is to say, in the case of making the natural period of the jacket 3 longer, it is preferable to concentrate it in the upper portion as shown in FIG. 3.

Moreover, as the length ratio from the upper portion exceeds 50% and becomes 100%, there is a tendency for the natural frequency to become longer. For this reason, in the case of shortening the natural frequency, it is desirable to make the length ratio from the upper portion 50% or less or 60% or less. However, the minimum length ratio often depends on the leg length between the nodular point portions $31a$, $31b$, $31c$ at which the horizontal braces 35 intersect with the legs 34, that is to say, the length between the nodular point portion $31a$ and the nodular point portion $31b$, and the length between the nodular point portion $31b$ and the nodular point portion $31c$, and it is preferable to fill a leg length of at least one layer portion. In many cases, since the jacket structure consists of 10 layers or less, with regard to the preferred length ratio, approximately 10% is the minimum range. That is to say, it is preferable for the length ratio from the upper portion to be 10% or more, 15% or more, or 20% or more. In terms of length from the upper portion, 5 meters or more, 8 meters or more, or 10 meters or more is preferable.

Although the example of change of the frequency (period) of the jacket 3A of the first embodiment and the jacket 3B of the second embodiment is not large in that the change amount of the frequency is from 6% to 15%, since the object of adjusting the natural period in the underwater structure is to remove the resonance domain so that it does not resonate with the frequency area due to the frequency of the windmill that is the upper structure, even in the change amount of the frequency as described above, it is possible to attain the predetermined object. Also, in the case of increasing the change amount, it is preferable to fill the concrete C in a portion of the diagonal braces 36B or 36T.

In addition, since the change of the frequency in a structure not filled with concrete in the case of the height of the underwater structure changing by 10 m is approximately 10%, in the case of the design water depth changing by approximately 5 m, or in the case of the water depth changing by approximately 5 m due to scouring, even in the preceding concrete filling range, since adjustment of the natural period is possible, the concrete filling method in the present invention has a sufficient effect in practice.

Next, the design method of the jackets 3A and 3B of the first embodiment and the second embodiment as given above shall be described.

Figure 4:
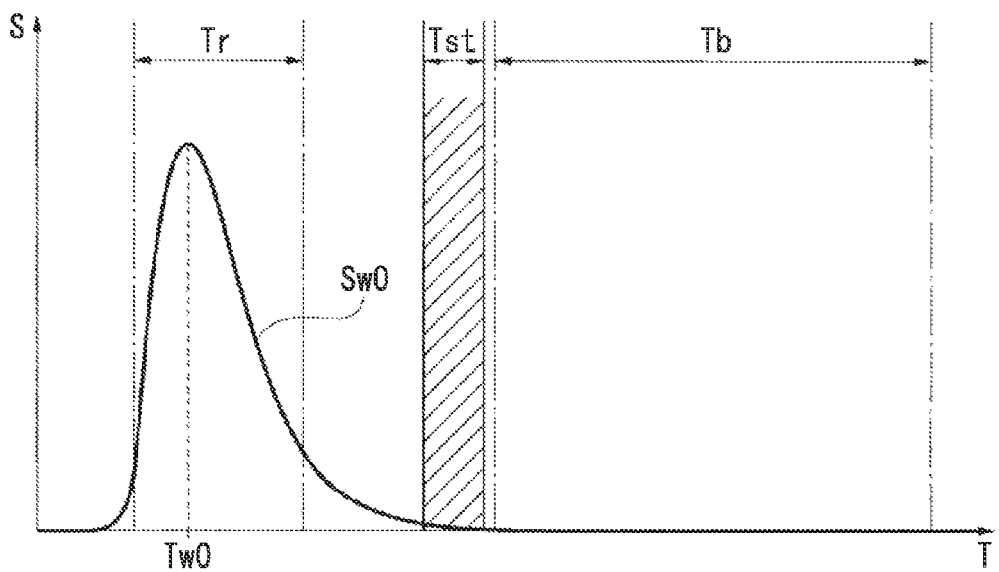
FIG. 4 is a graph that shows the design period of the same underwater structure.

The natural periods Ts1, Ts2 of the frames 31A and 31B are adjusted so as to enter a region that does not overlap with any of the peak period Tw0 of the spectrum Sw0 of waves in an ocean or a lake, the natural period region Tr of the rotating body 24 of the windmill 2, and moreover the natural period region Tb corresponding to the rotation of the blades 26, or to enter the design period region (target period) Tst in which the overlap becomes a minimum as shown in FIG. 4. That is to say, among the first space $34a$ of the leg 34, the second space $35a$ of the horizontal brace 35, and the second space $36a$ of the diagonal brace 36, the filling position and filling amount of the concrete C that fills at least a portion of the first space $34a$ of the leg 34 is calculated so that the natural periods Ts1, Ts2 enter the design period region Tst. Then, the concrete of the calculated filling amount is filled to the calculated filling position.

Specifically, in the case of the natural period Ts0 of the frame 31 in the case of not filling concrete C being near the peak period Tw0 of waves or the natural period region Tr of the rotating body 24, by filling the concrete C in the upper portion of the frame 31B as in the jacket 3B of the second embodiment shown in FIG. 3, the period is lengthened.

Conversely, in the case of the natural period Ts0 entering the natural period region Tb corresponding to the rotation of the blades 26, concrete C is filled in the lower portion of the frame 31A, in the manner of the jacket 3A of the first embodiment shown in FIG. 2, to shorten the period.

Next, the construction method of the jacket 3 designed as described above (the jacket 3A of the first embodiment and the jacket 3B of the second embodiment) shall be described.

Firstly, the construction method (installation procedure) of the first jacket 3 shall be described. In this construction method, first, the frame 31 is manufactured by assembling the legs 34, the horizontal braces 35, and the diagonal braces 36, in an assembly yard on a coastal portion or on land not shown. The jacket 3 is formed by fixing the platform 32 and the connection portions 33 to this frame 31. Next, based on the aforementioned design result (the calculated filling position and filling amount of the concrete C), the concrete C is filled in the upper portion or lower portion of the frame 31 in an assembly yard (filling step). When the jacket 3A of the first embodiment or the jacket 3B of the second embodiment has been manufactured by filling the concrete C in this manner, it is conveyed to the installation location by a conveying means such as a barge or the like. Next, at the installation location, the installation of the jacket 3 is completed by fixing it to the sea bed G by the fixing method with the aforementioned piles 4 (installation step), then by fixing the windmill 2, which is separately conveyed, to the platform 32, the wind-power generation facility 1 is completed.

In this construction method, the workability of the filling work improves, and it is possible to improve the filling characteristic in each member, and moreover, it is possible to make the length of piping for filling shorter than the case of filling the concrete C after installing the jacket 3A, 3B on the sea bed G.

Next, the construction method (installation procedure) of the second jacket 3 shall be described. First, the frame 31 is manufactured by assembling the legs 34, the horizontal braces 35, and the diagonal braces 36, in an assembly yard. The jacket 3 is formed by fixing the platform 32 and the connection portions 33 to this frame 31. At this time, piping for conveying concrete is fixed to a predetermined position of the jacket 3. Next, the jacket 3 is conveyed to the installation location by a barge or the like, and at the installation location, the jacket 3 is fixed to the sea bed G by a fixing method with the aforementioned piles 4 (installation step). After fixing the jacket 3 to the sea bed G, based on the aforementioned design result (the calculated filling position and filling amount of the concrete C), the concrete C is pumped by a pressure pump via the piping to the upper portion or lower portion of the frame 31 to fill it (filling step). When the jacket 3A of the first embodiment or the jacket 3B of the second embodiment has been manufactured by being filled with the concrete C in this manner, then by fixing the windmill 2, which has been separately conveyed, to the platform 32, the wind-power generation facility 1 is completed. Note that the filling of the concrete C in the frame 31 may be performed after the fixing of the windmill 2. In this case, the natural period of the rotating body 24 or the blades 26 of the windmill 2 that has been fixed are measured, and the design period region Tst is corrected using this measurement value. Based on this corrected design period region Tst, the filling position and filling amount of the concrete C that fills are reset, and then the concrete C may be filled in the frame 31.

In this construction method, it is possible to lighten the weight when conveying the jackets 3A and 3B to the installation location, and it is possible to improve the conveying efficiency.

According to the embodiment as given above, it is possible to obtain the following effects.

That is to say, by filling the concrete C in the upper portion or the lower portion of the frame 31, it is possible to easily adjust the natural periods Ts1, Ts2 of the jacket 3. Accordingly, it is possible to stagger the natural periods of the waves, the rotating body 24, the blades 26, and the natural periods Ts1, Ts2 of the jacket 3 without changing the cross-sectional dimensions of the leg 34, the horizontal brace 35, and the diagonal brace 36 that are determined based on the strength design of the frame 31. Thereby, it is possible to prevent resonating of the rotating body 24, the blades 26 and the jacket 3. Accordingly, it is possible to simplify the design step of the jacket 3, and it is possible to realize an economical design. Furthermore, due to the simplification of the design step, standardization of members such as the legs 34 that constitute the frame 31 is achieved, and excessive reinforcement of the frame 31 can be omitted, and by eliminating the adverse effects on the manufacturing step, it is also possible to improve the manufacturing efficiency.

Note that the present invention is not limited to only the present embodiments, and includes other constitutions that can attain the object of the present invention, and the modifications as shown below are included in the present invention.

For example, in the present embodiment, the wind-power generation facility 1 using the jacket 3 was shown as an example of an underwater structure, but the underwater structure of the present invention is not limited to the jacket 3, and may also be the constitutions as shown in the following FIG. 5, FIG. 6, and FIG. 7.

Figure 5:
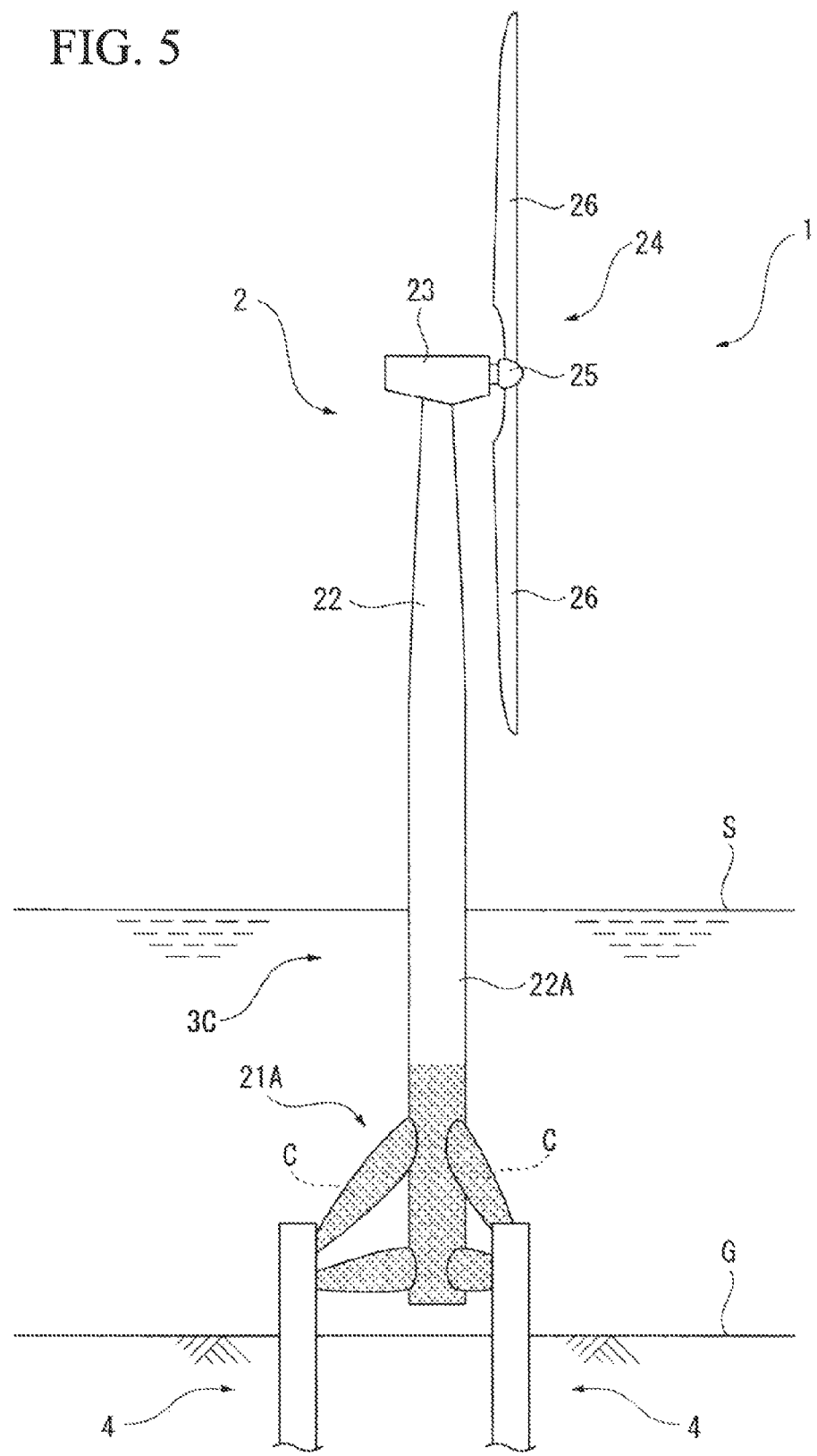
FIG. 5 is a side view that shows another structural example of a wind-power generation facility using an underwater structure according to one embodiment of the present invention.

In FIG. 5, the underwater structure 3C is a tripod structure provided with a support column extension portion (first support member) 22A and a truss-shaped base (second support member) 21A.

The base 21A is coupled with the pile heads of three piles 4 that are provided in the sea bed G and the support column extension portion 22A. The support column extension portion 22A is continuous with the support column 22 of the windmill 2, and is coupled with the base 21A by being extended until the vicinity of the sea bed G.

In this underwater structure 3C, as one example, the concrete C is filled in the base 21A and a portion of the support column extension portion 22A on the sea bed G side.

Figure 6:
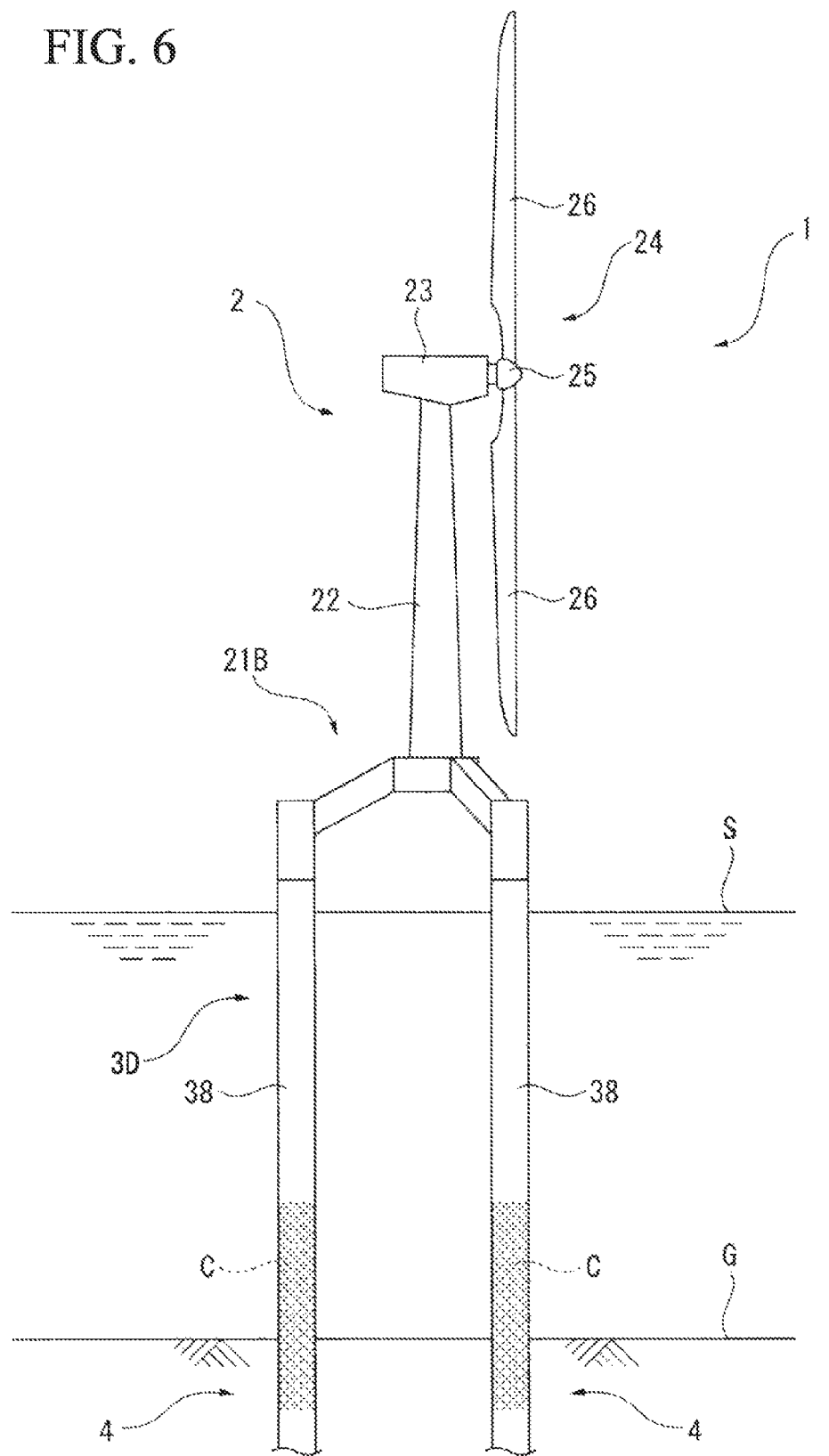
FIG. 6 is a side view that shows another structural example of a wind-power generation facility using an underwater structure according to one embodiment of the present invention.

In FIG. 6, the underwater structure 3D is constituted by pile extension portions 38 that are continuous with the three piles 4 and extended to above the water. It is a tri-pile structure in which the upper end portion of each of these pile extension portions (first support members) 38 and the windmill (above-water structure) 2 are coupled by a three-pronged base (second support member) 21B. In the underwater structure 3D, as one example, the concrete C is filled in a portion of the pile extension portions 38 on the sea bed G side. Although the filling position of the concrete C is not limited, it is preferred to fill more concrete in the underwater pile extension portions 38 in which the contribution is large to adjustment of the natural frequency, than to fill the concrete C in the pile extension portions 38 at the sea bed G. Also, in the case of lengthening the natural period of the underwater structure 3D, the concrete C is filled in the base 21B and the water surface S side of the pile extension portions 38. Thereby, it is possible to provide an underwater structure that has the desired natural period.

In the underwater structure s 3C, 3D as described above, due to the concrete C being filled as a filling material in the interior of the base 21A and the support column extension portion 22A, the pile extension portions 38, added weight and added rigidity are imparted, it is possible to adjust the natural period of the underwater structure s 3C and 3D.

Figure 7:
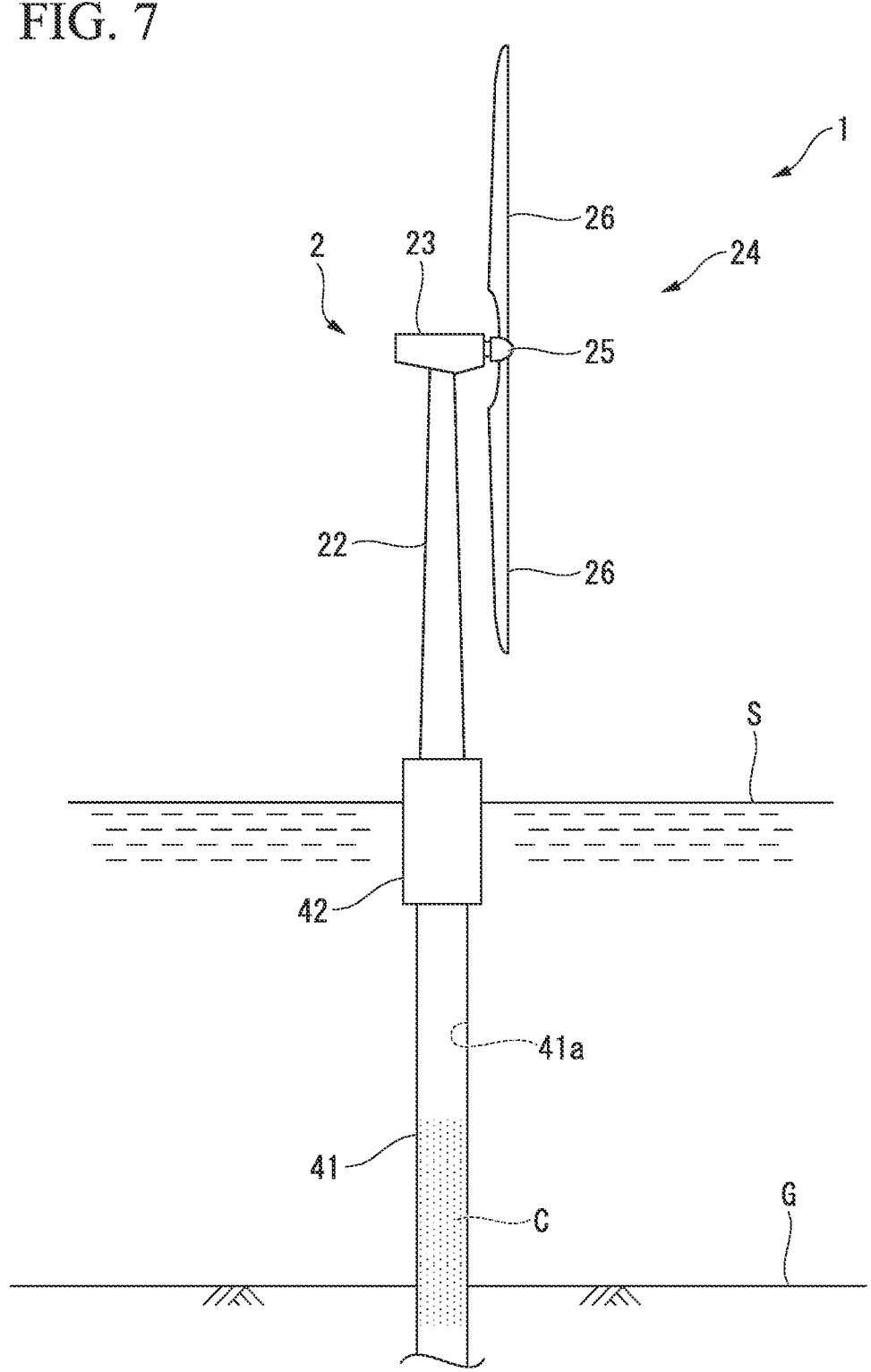
FIG. 7 is a side view that shows another structural example of a wind-power generation facility using an underwater structure according to one embodiment of the present invention.

In FIG. 7, the underwater structure 3E is a mono-pile structure that is provided with a steel pipe pile (first support member) 41 made of steel that extends from the sea bed G to above water S, and has a first space 41a therein. In this constitution, the support column 22 and the steel pipe pile 41 are joined by a grout joint portion 42. The concrete (filling material) C is filled in a portion of the first space 41a of the steel pipe pile 41, and in FIG. 7, the concrete C is filled from the sea bed G to the middle area of the steel pipe pile 41. The filling position of the concrete C is not limited, but it is preferred to fill more of the concrete C in the steel pipe pile 41 that is underwater where the contribution to adjustment of the natural frequency is large, than to fill the concrete C in the steel pipe pile 41 at the sea bed G.

Also, as shown in FIG. 7, the design method of the mono-pile structure calculates the filling position and the filling amount of the concrete C to be filled in a portion of the first space 41a of the steel pipe pile 41 so that the natural period of the underwater structure 3E enters the design period region Tst, in the same manner as the jacket structure described above. Then, since the filling material of the calculated filling amount is filled to the calculated position, it is possible to stagger the natural periods of the waves, the rotating body 24, the blades 26 and the natural period of the underwater structure 3E, without changing the cross-sectional dimensions of the steel pipe pile 41. Thereby, it is possible to prevent resonance of the rotating body 24, the blades 26, and the underwater structure 3E.

Furthermore, as a construction method of the first underwater structure 3E, the concrete C is filled in the first space 41a of the steel pipe pile 41 (filling step), and then the underwater structure 3E is installed at the sea bed G (installation step). Also, as the construction method of the second underwater structure 3E, the underwater structure 3E is installed at the sea bed G (installation step), and then the concrete C is filled in the first space 41a of the steel pipe pile 41 (filling step). In the mono-pile structure, it is possible to use the construction methods of the first and second underwater structure s, and it is possible to obtain the same effect as the jacket structure.

Also, the above embodiments illustrated the example of the wind-power generation facility 1 that is provided with the windmill 2 serving as the upper structure, but they are not limited to supporting the windmill 2, and they may be utilized as a structure for oil drilling, or may be utilized as a harbor facility such as a dock or a man-made island. Also, as the wind-power generation facility 1, it is not limited to a constitution that supports a single windmill 2 by a single jacket 3, as in the above embodiments, and they may be constituted to support a plurality of windmills 2 with a single jacket 3, and may support a single windmill 2 with a plurality of jackets 3. Even in the case of variously changing the combination of the jacket 3 and the windmill 2 in this way, by filling the filling material only in the frame 31 as in the embodiments, it is possible to easily adjust the natural period thereof. Thereby, it is possible to effectively prevent resonance between the windmill 2 and the jacket 3, and it is possible to realize economical design and manufacture.

Also, the filling material is not limited to concrete, and may be any of reinforced concrete, fiber reinforced concrete, mortar, or crushed rock, and these may be filled in the frame 31 by mixing those suitably chosen from these, or used separately.

Also, the leg 34, the horizontal brace 35, and the diagonal brace 36 are steel pipes having a closed cross section, but are not limited thereto. That is to say, when filling the concrete C in only the legs 34, at least the leg 34 may have a closed cross section.

Also, although the concrete C was filled in the leg 34, the horizontal brace 35, and the diagonal brace 36, in the case of obtaining the desired natural period by filling the concrete C only in the leg 34, there is no need to fill the concrete C in the horizontal brace 35 and the diagonal brace 36.

Also, in the embodiments, the procedure was described from design to installation when newly installing the wind-power generation facility 1, but the present invention is also useful for a renovation method of an existing underwater structure.

That is to say, in the state of the wind-power generation facility 1 as shown in FIG. 1 of the embodiment being already put into service, in the case of renovating accompanying a change in the surrounding environment of the existing jacket 3, for example, in the case of an environmental change such as scouring of the foundation at the sea bed G due to ocean currents, the foundation surface at the sea bed G goes down, and thus the protrusion length of the piles 4 becomes longer. Thereby, there is a possibility of the natural period of the jacket 3 deviating from the initially designed value, and agreeing with the period of the waves, or rotation period of the rotating body 24 or blades 26 of the windmill 2. In this case, the concrete C of the filling amount that is calculated based on the change amount of the surrounding environment is filled in at least a portion of the first space 34a of the leg 34, among the first space 34a of the leg 34, the second space 35a of the horizontal brace 35, and the second space 36a of the diagonal brace 36.

Also, in the wind-power generation facility 1 that has already been put into service, in the case of the natural period of the windmill 2 changing after renovation, for example, in the case of replacing the entire windmill 2, or in the case of the design conditions changing, such as replacing it with blades 26 in which the blade number or length differ, the natural period region Tb fluctuations in accordance with the rotation of the blades 26, and thus there is a possibility of it overlapping with the natural period of the jacket 3 during service. In this case, the concrete C of the filling amount that is calculated based on the change amount of the natural period Tb is filled in at least a portion of the first space 34a of the leg 34, among the first space 34a of the leg 34, the second space 35a of the horizontal brace 35, and the second space 36a of the diagonal brace 36. That is to say, piping or the like for conveying the filling material is fixed to the frames 31A, 31B of the jacket 3 in advance, and by pressure filling the filling material in the upper portion or lower portion of the frame 31 in the same manner as the construction method of the second jacket 3 (installation step), it is possible to easily adjust the natural period of the jacket 3, and it is possible to prevent resonance between the waves and the rotating body 24, the blade 26, and the jacket 3.

Also, the aforementioned renovation method of an underwater structure can also be applied a mono-pile structure shown in FIG. 7, and it is possible to obtain the same effect.

In addition, the optimal constitutions and methods for carrying out the present invention were disclosed in the above description, but the present invention is not limited thereto. That is to say, although the present invention is mainly illustrated and described based on specific embodiments thereof, it should be understood that various changes in the shape, material, quantity, and other details of construction can be made by those skilled in the art based on the embodiments described above without departing from the technical idea and objects of the present invention.

Accordingly, the description disclosed above, which gives specific shapes, materials and the like, is just an exemplary description to make the present invention well understood instead of being a definition of the limits of the invention, therefore the description based on a component name without part or all of the specific shape, material and the like is included in the present invention.

| DESCRIPTION OF REFERENCE NUMERALS | |
|---|---|
| 2 | windmill (above-water structure) |
| 3 (3A, 3B) | jacket (underwater structure) |
| 3C, 3D | jacket (underwater structure) |
| 3E | underwater structure |
| 24 | rotating body |
| 31 | framework |
| 34 | leg (first support member) |
| 35 | horizontal brace (second support member) |
| 36 | diagonal brace (second support member) |
| 41 | steel pipe pile (first support member) |
| G | sea bed |
| S | water surface |

The invention claimed is:

1. An underwater structure that is installed at a sea bed and that supports an above-water structure that is provided above a water, wherein:
   the underwater structure comprises a first support member made of steel that extends from the sea bed to above the water, the first support member being formed with a first space therein, and a filling material filled in the first space;
   the first space has a portion in which the filling material is filled;
   the portion of the first space is (i) an upper end portion which includes an upper end side of the first support member or (ii) a lower end portion which includes a lower end side of the first support member that is at least 10% of the total length of the first support member; and
   the filling material is filled to adjust a natural period of the underwater structure such that the natural period of the underwater structure differs from a natural period of the above-water structure.

2. The underwater structure according to claim 1, wherein the underwater structure comprises:
   a plurality of the first support members; and
   a second support member made of steel that couples the plurality of the first support members, the second support member being formed with a second space therein.

3. The underwater structure according to claim 2, wherein the second space has a portion in which the filling material is filled.

4. The underwater structure according to claim 1, further comprising;
   a second support member made of steel that couples the above-water structure and the first support member, or couples the first support member and another member that is provided at the sea bed, the second support member being formed with a second space therein.

5. The underwater structure according to claim 4, wherein the second space has a portion in which the filling material is filled.

6. The underwater structure according to any one of claims 1 to 5, wherein:
   at least the first support member among the first support member and the second support member includes a steel pipe having a closed cross section; and
   the filling material is filled within the steel pipe.

7. The underwater structure according to any one of claims 1 to 5, wherein:
   the filling material includes any of concrete, reinforced concrete, fiber-reinforced concrete, mortar, and crushed rock.

8. The underwater structure according to any one of claims 1 to 5, wherein:
   the above-water structure comprises a rotating body.

9. A method of constructing the underwater structure according to any one of claims 2 to 5, comprising:
   filling the filling material in at least a portion of the first space, among the first space and the second space; and
   installing the underwater structure at the sea bed, after filling the filling material.

10. A method of constructing the underwater structure according to any one of claims 2 to 5, comprising:
    installing the underwater structure at the sea bed; and
    filling the filling material in at least a portion of the first space, among the first space and the second space.

11. A method of constructing the underwater structure according to claim 1, comprising:
    filling the filling material in a portion of the first space; and
    installing the underwater structure at the sea bed, after filling the filling material.

12. A method of constructing the underwater structure according to claim 1, comprising:
    installing the underwater structure at the sea bed; and
    filling the filling material in a portion of the first space, after installing the underwater structure.

13. A method of designing the underwater structure according to any one of claims 2 to 5, comprising:
    calculating a design period region that does not overlap the natural period of the above-water structure based on the natural period thereof;
    calculating a filling position and a filling amount of the filling material to be filled in at least a portion of the first space, among the first space and the second space, such that the natural period of the underwater structure enters the design period region; and
    filling the filling material of the filling amount at the filling position.

14. A method of designing the underwater structure according to claim 1, comprising:
    calculating a design period region that does not overlap the natural period of the above-water structure based on the natural period thereof;
    calculating a filling position and a filling amount of the filling material to be filled in a portion of the first space, such that the natural period of the underwater structure enters the design period region; and
    filling the filling material of the filling amount to the filling position.

15. A method of renovating an existing underwater structure that is provided with a first support member made of steel that is installed at a sea bed and that supports an above-water structure provided above a water, the renovating being performed along with changes in a surrounding environment, the method comprising:
    calculating a filling position and a filling amount of a filling material based on a difference between the natural period of the underwater structure and a design original value of the natural period of the underwater structure;
    and filling the filling material of the calculated amount in a portion of a first space that is formed in the first support member, the portion corresponding to the filling position.

16. A method of renovating an existing underwater structure that is provided with a first support member made of steel that is installed at a sea bed and that supports an above-water structure provided above a water, the method comprising:
    in a case where the natural period of the above-water structure changes before and after the renovation, calculating a filling position and a filling amount of a filling material based on a change amount of this natural period, and filling the filling material of the calculated amount in a portion of a first space that is formed in the first support member, the portion corresponding to the filling position.

17. The method of renovating the underwater structure according to claim 15 or claim 16, comprising:
    in a case where a plurality of the first support member is provided, and the underwater structure is further provided with a second support member made of steel that connects these first support members and that has a second space therein, filling the filling material in at least a portion of the second space.

* * * * *